United States Patent [19]
Anderson

[11] 3,806,671
[45] Apr. 23, 1974

[54] DEVICE FOR STORING AN ELECTRICAL CORD

[76] Inventor: Arthur Eugene Anderson, 3 Abington Pl., Northport, N.Y. 11768

[22] Filed: Oct. 13, 1972

[21] Appl. No.: 297,460

[52] U.S. Cl. .......................................... 191/12.2 R
[51] Int. Cl. ............................................. H02g 11/00
[58] Field of Search ..................... 191/12.2 R, 12.4

[56] References Cited
UNITED STATES PATENTS
3,147,833   9/1964   McWilliams ..................... 191/12.4
2,270,997   1/1942   Davis ............................... 191/12.4

*Primary Examiner*—M. Henson Wood, Jr.
*Assistant Examiner*—D. W. Keen
*Attorney, Agent, or Firm*—Carlos Nieves

[57] ABSTRACT

A handle for an electrical tool includes a cylindrical body having a pair of flanges, a thread between the pair of flanges, and a bore which extends axially through the cylindrical body and radially into communication with the thread. One end of the cylindrical body is coupled to the tool and the other end of the cylindrical body supports a cap, the coupling connected to the body and the cap having larger diameters than the flanges. The flanges rotatably support a longitudinally slotted cylinder whose ends, respectively, abut the coupling and the cap. Thus, the threaded part of the cylindrical body, the slotted cylinder, and the flanges define a cylindrical space which is suitable for storing an electrical cord. Operatively, an electrical cord extends from the coupling, through the bore, over the thread, and through the slot. Rotation of the slotted cylinder with respect to the cylindrical body in one direction causes the cord to be paid out; and rotation in the opposite direction causes the cord to be taken into the cylindrical space and onto the thread, thereby being stored.

11 Claims, 5 Drawing Figures

PATENTED APR 23 1974  3,806,671

DEVICE FOR STORING AN ELECTRICAL CORD

The subject invention relates to devices for storing an electrical cord and in particular to a device for storing an electrical cord which may be used as part of or in conjunction with electrically operated apparatus.

Many electrical tools are in existence today. These tools are generally carried by workmen in tool boxes. After these tools have been used, some workmen hand-wind the electrical cord associated with the tool used and place a rubberband around the wound cord before returning the tool to the tool box. Other workmen, either because they have lost their rubberband or other means for protecting the electrical cord, simply place their tool in the tool box, the electrical cord remaining loose. As a result, the electrical cord is frayed, cut, or otherwise damaged in the tool box, thereby creating a hazardous situation and shortening the useful life of the tool so handled.

Although domestic electrical tools such as hot combs or can openers are not stored in tool boxes, their electrical cords may contain excess slack which, in addition to being an eyesore, is dangerous in that it may be stepped on or tripped over in consequence of which persons or property may be injured.

Accordingly, it is an object of the present invention to provide a device for storing an electrical cord which may be used as part of or in conjunction with electrically operated tools.

It is another object of the present invention to provide a device for protecting the electrical cord of a tool.

It is still another object of the present invention to provide a device for storing an electrical cord which is of simple construction, inexpensive to manufacture, reliable and easy to operate.

The above mentioned objects are met, according to the invention, by a device for storing an electrical tool comprising: (a) a cylindrical body having a thread about its surface which is adapted to seat an electrical cord, and a bore communicating with the thread; and (b) a housing rotatably coupled to the cylindrical body and defining a cylindrical space about the thread on the cylindrical body, said housing having a slot extending into the cylindrical space, whereby the length of a section of an electrical cord extending through the bore, over the thread, and through the slot may be varied by rotating the cylindrical body with respect to the housing.

Additional objects and features of the invention will become apparent by reference to the following description in conjunction with the accompanying drawing, in which.

Figure 1:
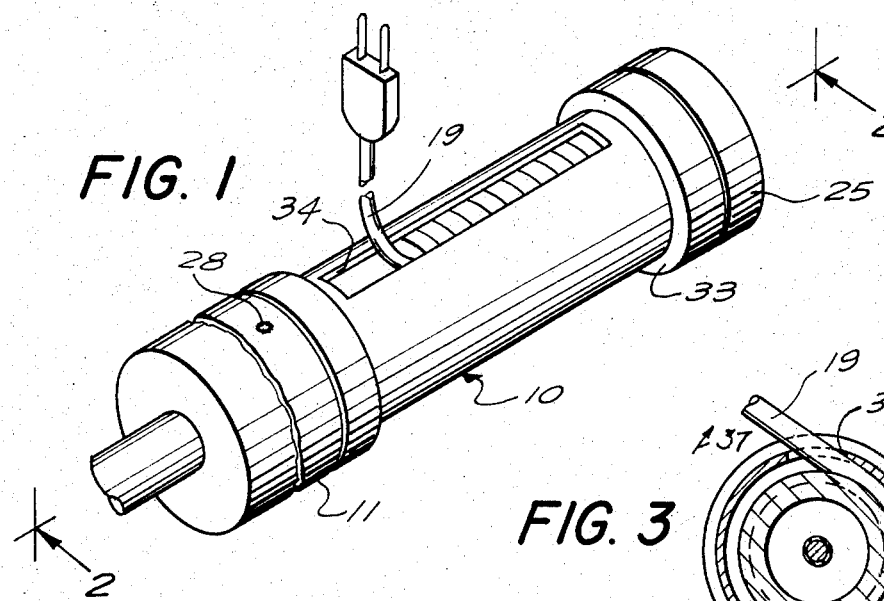
FIG. 1 is a partial perspective view of an electrical tool having a handle, according to the invention, which is capable of storing the tools electrical cord.

In an embodiment of a device for storing an electrical cord, according to the invention, the device, as shown in FIG. 1, serves as a handle 10 to which a tool 11 requiring electrical energy is connected.

Figure 2:
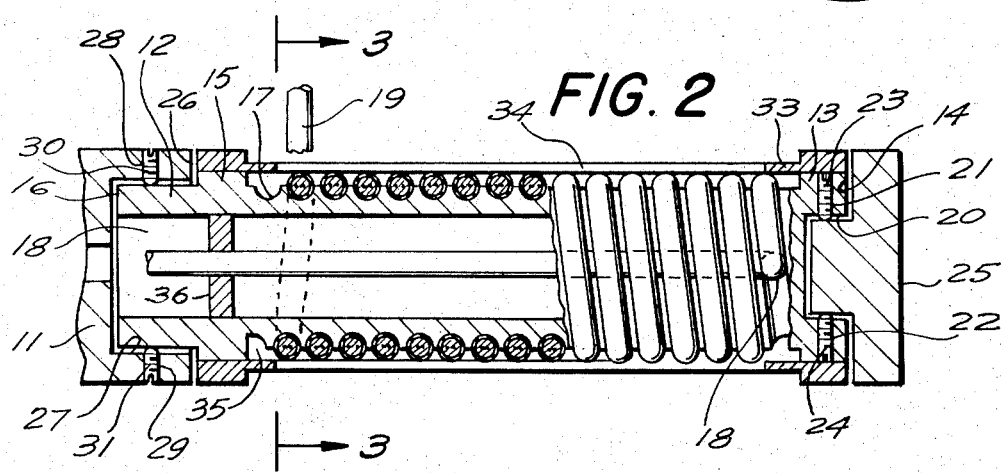
FIG. 2 is a cross-sectional view of the handle, taken along line 2—2 in FIG. 1, which shows the interconnections between parts of the handle, and the arrangement of the electrical cord within the handle.

As shown in FIGS. 1 and 2, the handle 10 includes a cylindrical body 12 having a flange 13 at one end 14 and a flange 15 near its other end 16. The surface of the cylindrical body 12 between the flanges 13 and 15 is threaded 17, and the end of the thread nearest the flange 13 communicates with a bore 28 extending radially into the body and longitudinally along the axis of the body to the end 16. Preferably, for reasons which will become obvious from the following, the shape of the thread 17 and the diameter of the radial section of the bore is selected to accommodate the shape of an electrical cord 19. In addition to the above, the cylindrical body includes a bore 20 which extends axially from end 14 and a pair of tapped holes 21 and 22 extending radially through the flange 13 into communication with the bore 20. The bore 20 and screws 23 and 24 which extend through the tapped holes 21 and 22, respectively, are used to secure the boss of a cap 25 to the cylindrical body 12.

The cap 25 is a cylindrical member having a diameter which is slightly larger than the diameter of the flange 13 and is held in abutment against the end 14 by the engagement between its boss, and the screws 23 and 24 extending into the bore 20.

An end 26 of the electrical tool 11 has a diameter which is larger than the diameter of the flange 15 and includes a bore 27, and two diametrically opposed and radially extending tapped holes 28 and 29 which communicate with the bore 27. As shown in FIG. 2, the size of the bore 27 is such that it snugly engages the surface of the cylindrical body between the flange 15 and the end 26, and the electrical tool is coupled to the handle by a pair of screws 30 and 31 extending through the tapped holes 28 and 29, respectively, into abutment with the cylindrical body 12.

The flanges 13 and 15 of the cylindrical body 12, the cap 25, and the end 26 of the electrical tool rotatably support a cylindrical housing 33 having a longitudinal slot 34 which is substantially parallel to its axis. As a result of the rotatable coupling described, a cylindrical space 35 is provided about the threaded portion of the cylindrical body. Cylindrical space 35 is thick enough to permit the electrical cord 19 to be stored to sit in the thread 17 without interfering with the rotation of the housing 33 with respect to the cylindrical body 12 while at the same time it is thin enough to prevent groove jumping by the electrical cord.

Figure 3:
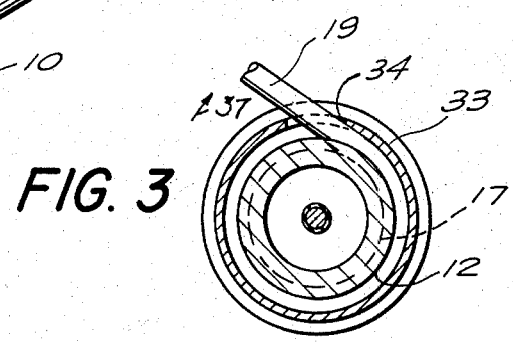
FIG. 3 is a cross-sectional view of the handle, taken along line 3—3 in FIG. 1.

The length of the longitudinal slot 34 is substantially equal to the length of the thread 17, and its width is dimensioned to permit, as shown in FIG. 3, an electrical cord 19 located in the cylindrical space to extend tangentially through the slot 34.

Referring to FIG. 2, the electrical cord 19 passes through the slot 34, over the thread 17, through the radial section of the bore 18, and through the longitudinal section of the bore 18, wherein it is supported by a support 36 fixed to the cylindrical body 12. From the bore the electrical cord extends into the electrical tool 11 wherein it is connected (not shown). Accordingly, when the cylindrical housing 33 is rotated with respect to the cylindrical body 12 in the direction indicated by the arrow 37 in FIG. 3, the electrical cord is paid out and when the direction of rotation is reversed, the electrical cord is taken in and stored.

Although a longitudinal slot 34 has been shown (see FIG. 1) and described, it should be noted that the slot need not be located longitudinally. For example, a slot which is spirally located on the housing may be used with the result that, depending on the direction and pitch of the spiral with respect to the thread, the amount of electrical cord taken in or paid out per relative rotation of the housing may be increased or decreased.

Moreover, it should be noted that the cylindrical housing 33 may be rotatably coupled to the cylindrical body 12 without the assistance of the cap 25 or the end 26 of the electrical tool 11. For example, a flange (not shown) on each of the flanges 13 and 15 may be used to axially restrain movement of the cylindrical housing.

Figure 4:
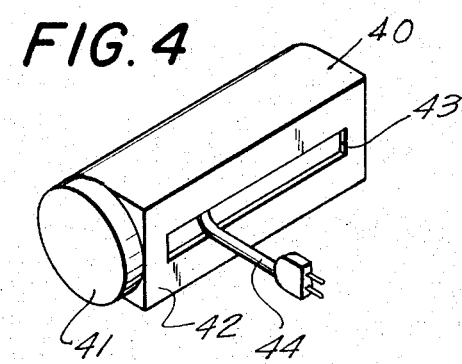
FIG. 4 is a perspective view of another device, according to the invention, for storing an electrical cord
Figure 5:
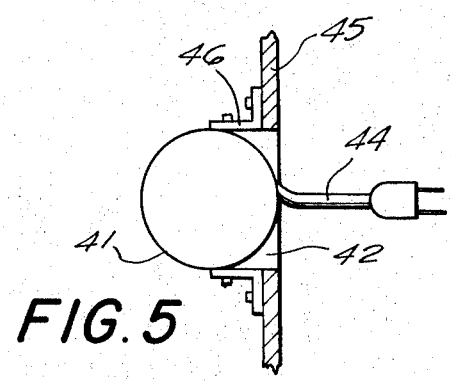
FIG. 5 is a side view of the device mounted to a part of a wall.

Although the housing 33 and the cylindrical body 12 should be rotatably coupled, the housing 33 need not be cylindrical. For example, as shown in FIGS. 4 and 5, a housing 40, according to the invention, may have a flat surface 42 which can be used to mount the device flush with the wall 45, of for example, a can opener (not shown). In such event, the housing may be fixed to the wall with brackets 46 or the like and the cap 41 may be used to rotate a cylindrical body (not shown) in the housing, thereby paying out or storing the electrical cord 44 through slot 43. Although not shown, the other end of the electrical cord may be connected, via slip rings, to the electrical mechanism of the can opener, thereby avoiding axial twisting of the electrical cord when the cap 41 is rotated.

In view of the above, it is to be understood that the description herein of a preferred embodiment, according to the invention, is set forth as an example thereof and is not to be construed or interpreted as a limitation on the claims which follow and define the invention.

What is claimed is:

1. A device for storing an electrical cord, comprising:
   a. a cylindrical body having a thread about its surface for seating the electrical cord, and a bore communicating with the thread;
   b. a housing rotatably coupled to the cylindrical body and defining a cylindrical space about the thread on the cylindrical body, said housing having a slot extending into the cylindrical space; and
   c. rigid means rigidly fixed to the cylindrical body and being located at least partially outside the housing for permitting rotation of the cylindrical body with respect to the housing, whereby the length of a section of an electrical cord extending through the bore, over the thread, and through the slot may be varied by rotating the rigid means with respect to the housing or by rotating the housing with respect to the cylindrical body.

2. A device as defined in claim 1 wherein the slot is parallel to the longitudinal axis of the cylindrical body.

3. A device as defined in claim 1 wherein the bore includes a section which is parallel to the longitudinal axis of the cylindrical body and another section which is transverse to the longitudinal axis.

4. A device as defined in claim 1 wherein the cylindrical body includes a pair of flanges, said thread being located between the flanges; wherein the housing is slidably engaged with the flanges; and wherein said means rigidly fixed to the cylindrical body include a cylindrical member rigidly fixed to an end of the cylindrical body, the outermost diameter of said member being greater than the inner diameter of the housing for limiting relative motion between the housing and the cylindrical body in an axial direction.

5. A device as defined in claim 4 wherein the bore includes a section which is concentric with the axis of the cylindrical body and another section which extends radially from the axis of said cylindrical body.

6. A device as defined in claim 1 wherein the thickness of the cylindrical space is adapted to accommodate an electrical cord while preventing axial movement of said cord when it is seated in the thread.

7. A device as defined in claim 6 wherein the housing is cylindrical and the slot is parallel to the longitudinal axis of the housing.

8. A device as defined in claim 7 wherein the cylindrical body includes a pair of flanges, said thread being located between the flanges, and the housing is rotatably coupled to the flanges.

9. A device as defined in claim 8 wherein the bore includes a section which is concentric with the axis of the cylindrical body and another section which extends radially from the axis of said cylindrical body.

10. A device as defined in claim 6 wherein the slot is parallel to the longitudinal axis of the housing and the width of said slot is sufficient to permit an electrical cord extending tangentially from the thread to pass through the slot.

11. A device as defined in claim 1 wherein said means rigidly fixed to the cylindrical body include a member rigidly fixed to an end of the cylindrical body, the outermost diameter of said member being greater than the inner diameter of the housing for limiting relative motion between the housing and the cylindrical body in an axial direction.

* * * * *